United States Patent
Henttonen et al.

(10) Patent No.: US 11,388,653 B2
(45) Date of Patent: Jul. 12, 2022

(54) METHOD AND APPARATUS PROVIDING ACCESS CONTROL

(71) Applicant: NOKIA TECHNOLOGIES OY, Espoo (FI)

(72) Inventors: Tero Henttonen, Espoo (FI); Malgorzata Tomala, Wroclaw (PL); Mikko Jyrki Olavi Kanerva, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/478,230

(22) PCT Filed: Jan. 17, 2017

(86) PCT No.: PCT/EP2017/050884
§ 371 (c)(1),
(2) Date: Jul. 16, 2019

(87) PCT Pub. No.: WO2018/133923
PCT Pub. Date: Jul. 26, 2018

(65) Prior Publication Data
US 2020/0107246 A1    Apr. 2, 2020

(51) Int. Cl.
*H04W 48/12*    (2009.01)
*H04W 76/10*    (2018.01)
*H04W 48/18*    (2009.01)
*H04W 48/02*    (2009.01)
*H04L 41/0806*    (2022.01)

(52) U.S. Cl.
CPC ......... *H04W 48/12* (2013.01); *H04L 41/0806* (2013.01); *H04W 48/18* (2013.01); *H04W 76/10* (2018.02)

(58) Field of Classification Search
CPC ..... H04W 48/12; H04W 48/18; H04W 76/10; H04L 41/0806
USPC .......................................... 455/434
See application file for complete search history.

(56) References Cited

U.S. PATENT DOCUMENTS

| | | | |
|---|---|---|---|
| 10,348,637 B1* | 7/2019 | McNair | H04L 45/46 |
| 2012/0039171 A1* | 2/2012 | Yamada | H04L 47/12 370/232 |
| 2012/0040643 A1* | 2/2012 | Diachina | H04W 4/70 455/411 |

(Continued)

FOREIGN PATENT DOCUMENTS

WO    2015103631 A1    7/2015

OTHER PUBLICATIONS

International Search Report and Written Opinion for International Application No. PCT/EP2017/050884, dated Aug. 29, 2017, 23 pages.

(Continued)

*Primary Examiner* — Inder P Mehra
(74) *Attorney, Agent, or Firm* — Brake Hughes Bellermann LLP

(57) ABSTRACT

A method comprises receiving information at a user device about one or more types of access and associated barring configuration information. The one or more types of access may comprise programmable access classes. The method further using by the user device one or more of said types of access and respective barring configuration information when determining whether to attempt access to a network.

8 Claims, 7 Drawing Sheets

(56) References Cited

U.S. PATENT DOCUMENTS

2014/0204838 A1* 7/2014 Kubota ................ H04W 48/10
370/328
2015/0173119 A1* 6/2015 Wirtanen .......... H04W 52/0212
455/452.1
2016/0205040 A1* 7/2016 Wirtanen .......... H04W 36/0022
370/230

OTHER PUBLICATIONS

3GPP TSG-RAN WG2 NR Ad Hoc; R2-1700397; "Access Control for NR"; Spokane, WA, USA; Jan. 17-19, 2017; 5 pages.
3GPP TSG RAN WG2 Meeting Ad Hoc; R2-1700216; "Consideration on Access Control Mechanism"; Spokane, WA, USA; Jan. 17-19, 2017; 3 pages.
3GPP TSG-SA WG1 #76; S1-163276 (revision of 106); "Discussion on Access Control"; Tenerife, Spain; Nov. 7-11, 2016; 9 pages.
3GPP TSG-RAN WG2 NR Ad Hoc; R2-1700453; "Unified access control mechanism for New RAT"; Spokane, WA, USA; Jan. 17-19, 2017; 4 pages.
First Office Action for Chinese Patent Application No. 201780087127. 3, dated Dec. 25, 2020, 7 pages.
Second Office Action for Chinese Patent Application No. 201780087127. 3, dated May 26, 2021, 11 pages.
Office Action for Chinese Application No. 201780087127.3, dated Dec. 1, 2021, 8 pages.

* cited by examiner

METHOD AND APPARATUS PROVIDING ACCESS CONTROL

CROSS-REFERENCE TO RELATED APPLICATIONS

This application is a national stage entry of International Application No. PCT/EP2017/050884, filed Jan. 17, 2017, entitled "METHOD AND APPARATUS PROVIDING ACCESS CONTROL" which is hereby incorporated by reference in its entirety.

FIELD OF INVENTION

Some embodiments relate to a method and apparatus providing an access control mechanism.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio networks. Standardization of 5G or New Radio networks is currently under discussion. LTE is being standardized by the 3rd Generation Partnership Project (3GPP).

LTE has an access control mechanism. However, the inventors have appreciated that there may be difficulties if that existing access control mechanism were simply to be applied to the proposed 5G system.

SUMMARY

According to an aspect, there is provided a method comprising: receiving information at a user device about one or more types of access and associated barring configuration information; and using by the user device one or more of said types of access and respective barring configuration information when determining whether to attempt access to a network.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by said user device at different times.

The associated barring configuration information may comprise a respective probability factor.

The associated barring configuration information may be dependent on a service type associated with a respective access type.

The method may comprise receiving one or more of said information about one or more types of access and said associated barring configuration information in one or more of a broadcast, multicast or unicast message.

The information about one or more types of access may comprise at least one indicator.

The indicator may comprise at least one of a default indicator, a priority indicator and a specific indicator.

The using may comprise using a stored value of at least one indicator and performing a check with a respect to said barring information corresponding to the indicator.

The using comprises determining if said barring information for an indicator corresponds to said type of access and if so access is not barred and if not barring said access.

According to another aspect, there is provided a method comprising causing information about one or more types of access and associated barring configuration information to be transmitted to at least one user device.

The method may comprise determining for a plurality of user devices one or more of said information about one or more types of access and said associated barring configuration information.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by a respective user device at different times.

The associated barring configuration information may comprise a respective probability factor.

The associated barring configuration information may be dependent on a service type associated with a respective access type.

The method may comprise causing one or more of said information about one or more types of access and said associated barring configuration information in one or more of a broadcast, multicast or unicast message.

The information about one or more types of access may comprise at least one indicator.

The indicator may comprise at least one of a default indicator, a priority indicator and a specific indicator.

The method may comprise causing information to be transmitted to a user device indicating if said user device is to use a default access barring method or a dynamic access barring method.

According to another aspect, there is provided an apparatus in a user device comprising at least one processor and at least one memory including computer code for one or more programs, the at least one memory and the computer code configured, with the at least one processor, to cause the apparatus at least to: receive information about one or more types of access and associated barring configuration information; and use one or more of said types of access and respective barring configuration information when determining whether to attempt access to a network.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by said user device at different times.

The associated barring configuration information may comprise a respective probability factor.

The associated barring configuration information may be dependent on a service type associated with a respective access type.

The at least one memory and the computer code may be configured, with the at least one processor, to receive one or more of said information about one or more types of access and said associated barring configuration information in one or more of a broadcast, multicast or unicast message.

The information about one or more types of access may comprise at least one indicator. The indicator may comprise at least one of a default indicator, a priority indicator and a specific indicator.

The at least one memory and the computer code may be configured, with the at least one processor, to use a stored value of at least one indicator and performing a check with a respect to said barring information corresponding to the indicator.

The at least one memory and the computer code may be configured, with the at least one processor, to determine if said barring information for an indicator corresponds to said type of access and if so access is not barred and if not barring said access.

According to another aspect, there is provided a control apparatus comprising at least one processor and at least one memory including computer code for one or more programs, the at least one memory and the computer code configured, with the at least one processor, to cause the apparatus at least to: cause information about one or more types of access and associated barring configuration information to be transmitted to at least one user device.

The at least one memory and the computer code may be configured, with the at least one processor, to determine for a plurality of user devices one or more of said information about one or more types of access and said associated barring configuration information.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by a respective user device at different times.

The associated barring configuration information may comprise a respective probability factor.

The associated barring configuration information may be dependent on a service type associated with a respective access type.

The at least one memory and the computer code may be configured, with the at least one processor, to cause one or more of said information about one or more types of access and said associated barring configuration information in one or more of a broadcast, multicast or unicast message.

The information about one or more types of access may comprise at least one indicator.

The indicator may comprise at least one of a default indicator, a priority indicator and a specific indicator.

The at least one memory and the computer code may be configured, with the at least one processor, to cause information to be transmitted to a user device indicating if said user device is to use a default access barring method or a dynamic access barring method.

According to another aspect, there is provided an apparatus in a user device comprising: means for receiving information about one or more types of access and associated barring configuration information; and means for using one or more of said types of access and respective barring configuration information when determining whether to attempt access to a network.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by said user device at different times.

The associated barring configuration information may comprise a respective probability factor.

The associated barring configuration information may be dependent on a service type associated with a respective access type.

The receiving means may be for receiving one or more of said information about one or more types of access and said associated barring configuration information in one or more of a broadcast, multicast or unicast message.

The information about one or more types of access may comprise at least one indicator.

The indicator may comprise at least one of a default indicator, a priority indicator and a specific indicator.

The means for using may be for using a stored value of at least one indicator and performing a check with a respect to said barring information corresponding to the indicator.

The using means may be for determining if said barring information for an indicator corresponds to said type of access and if so access is not barred and if not barring said access. According to another aspect, there is provided a control apparatus comprising means for causing information about one or more types of access and associated barring configuration information to be transmitted to at least one user device.

The apparatus may comprise means for determining for a plurality of user devices one or more of said information about one or more types of access and said associated barring configuration information.

Different types of access may be provided in dependence on one or more a service requested by a user device, a service type, service preferences, an active subscription of a user of said user device and one or more capability of said user device.

In some embodiments, a type of access provided may be dependent on a network slice.

Different types of access groups may be provided in dependence on one or more of at least one operator policy and network conditions.

Different ones of said access types may be usable by a respective user device at different times.

The associated barring configuration information may comprise a respective probability factor.

The associated barring configuration information may be dependent on a service type associated with a respective access type.

The causing means may be for causing one or more of said information about one or more types of access and said associated barring configuration information in one or more of a broadcast, multicast or unicast message.

The information about one or more types of access may comprise at least one indicator. The indicator may comprise at least one of a default indicator, a priority indicator and a specific indicator.

The causing means may be for causing information to be transmitted to a user device indicating if said user device is to use a default access barring method or a dynamic access barring method.

A computer program comprising program code means adapted to perform the method(s) may also be provided. The computer program may be stored and/or otherwise embodied by means of a carrier medium. The computer program may be provided on a non-transitory computer program carrying medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Some embodiments will now be described by way of example only and with reference to the following Figures in which.

DETAILED DESCRIPTION OF SOME EMBODIMENTS

Before explaining in detail the examples, certain general principles of a wireless communication system and mobile communication devices are briefly explained with reference to FIGS. 3 and 4 to assist in understanding the technology underlying the described examples.

Figure 3:
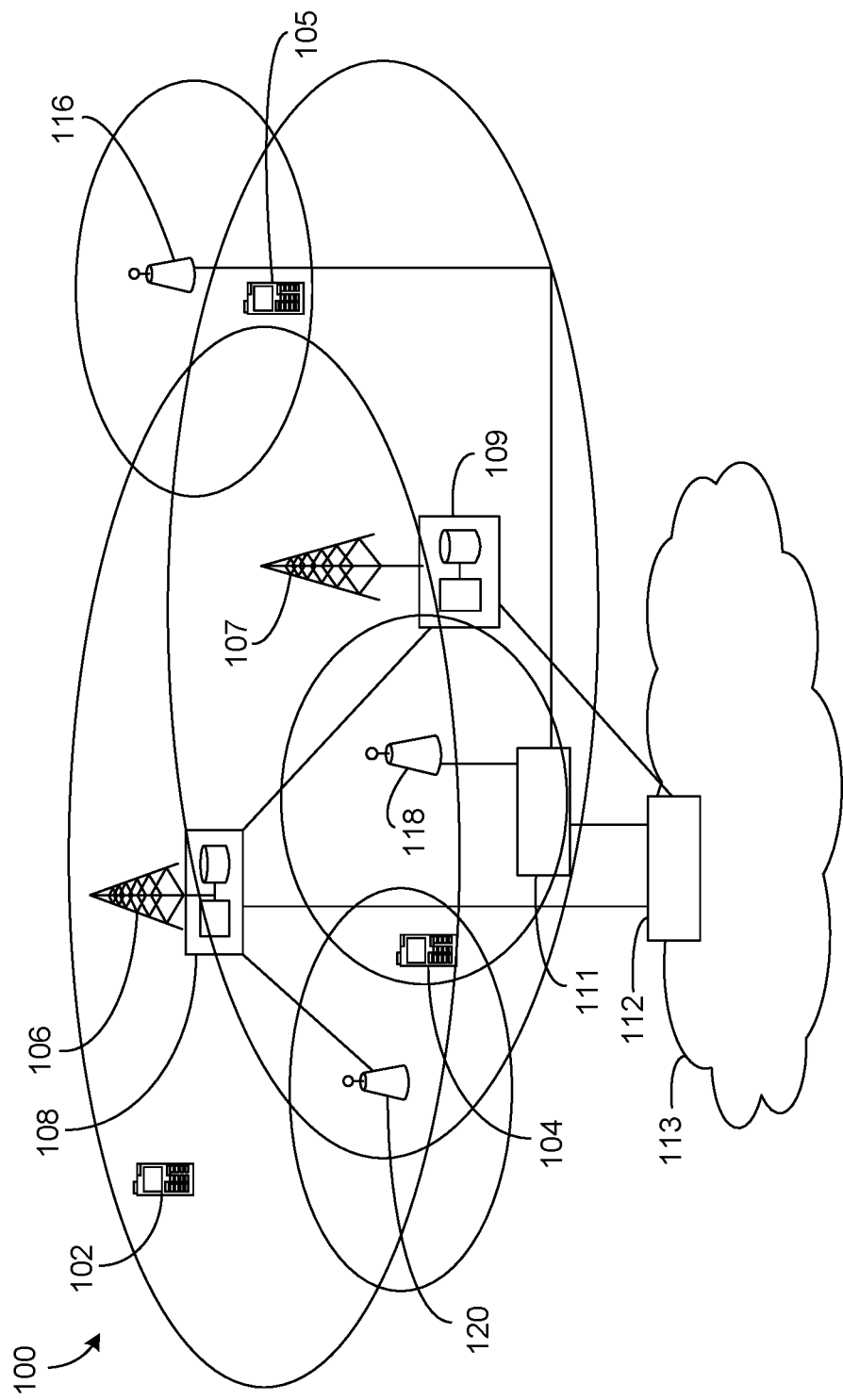
FIG. 3 shows a schematic diagram of an example communication system comprising a base station and a plurality of communication devices.

In a wireless communication system 100, such as that shown in FIG. 3, mobile communication devices or user equipment (UE) 102, 104, 105 are provided wireless access via at least one base station or similar wireless transmitting and/or receiving node or point. Base stations may be controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC) or CCNF (Common Control Network Function). In FIG. 3 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Smaller base stations, for example micro or pico base stations 116, 118 and 120 may be provided which overlay the cells of the macro base stations. Any types of base stations may be connected to one or more network elements 111 and 112, such as gateways which provide access to a network 113.

Figure 4:
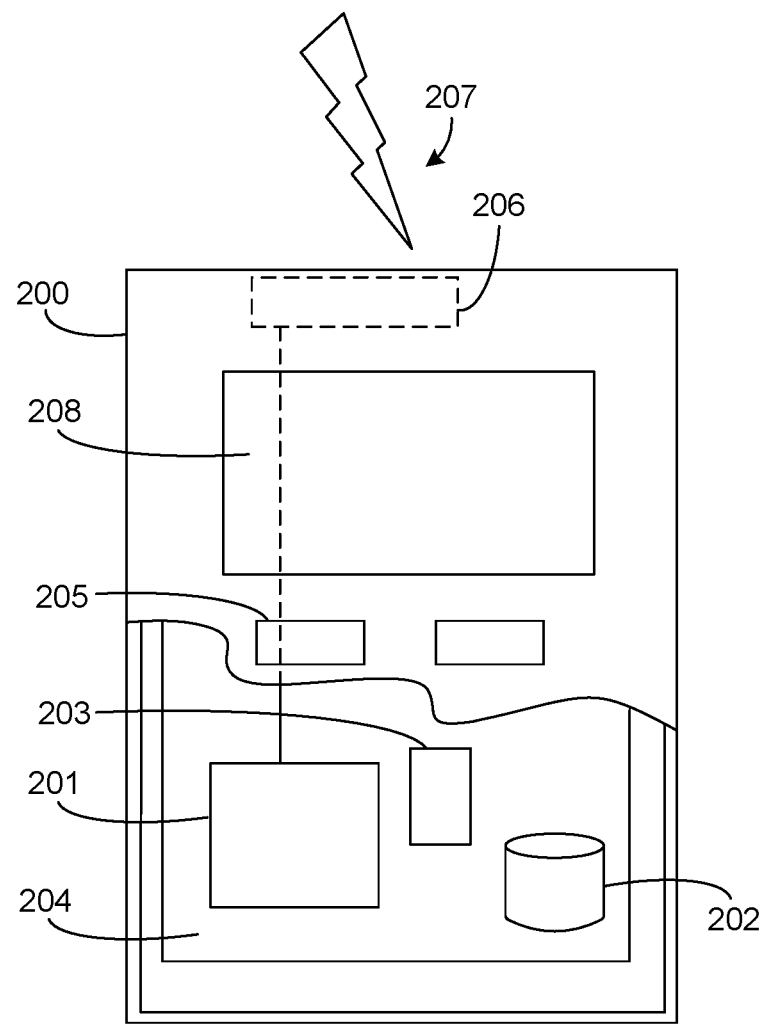
FIG. 4 shows a schematic diagram of an example mobile communication device.

A possible mobile communication device will now be described in more detail with reference to FIG. 4 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, video, electronic mail (email), text message, multimedia and so on. Users may thus be offered and provided numerous services via their communication devices and there may be one or more applications running in the MS requiring data transmission between the MS and the network. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, gaming, various alerts and other information.

The mobile device 200 may receive signals over an air or radio interface 207 via appropriate apparatus for receiving and may transmit signals via appropriate apparatus for transmitting radio signals. In FIG. 4 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

3GPP is currently making progress for 5G standardization. The New Radio (NR) aspects are widely studied and fundamental NR requirements documented in numerous Technical Reports (e.g. TR38.801, TR38.804, TR 23.799, TR 22.891) providing grounds for actual and standard compliant 5G technology implementation. The study phase provides insight into deployment scenarios and modelling of particular functionalities or procedures.

In 5G systems, different services may be used by the UE at a given time.

In a 5G system, high data rate transmissions are expected. Large bandwidth and efficient transmission schemes may be used in 5G systems, resulting in a significant increase in data rates, for example for the enhanced mobile broadband (eMBB) scenario.

For providing NR access to suitably capable user equipment, there are some deployment options considered on the Radio Access Network-Core Network (RAN-CN) interface, and the interface between Evolved UMTS Terrestrial Radio Access (E-UTRA) and New Radio Radio Access Technology (NR RAT).

Figure 1A:
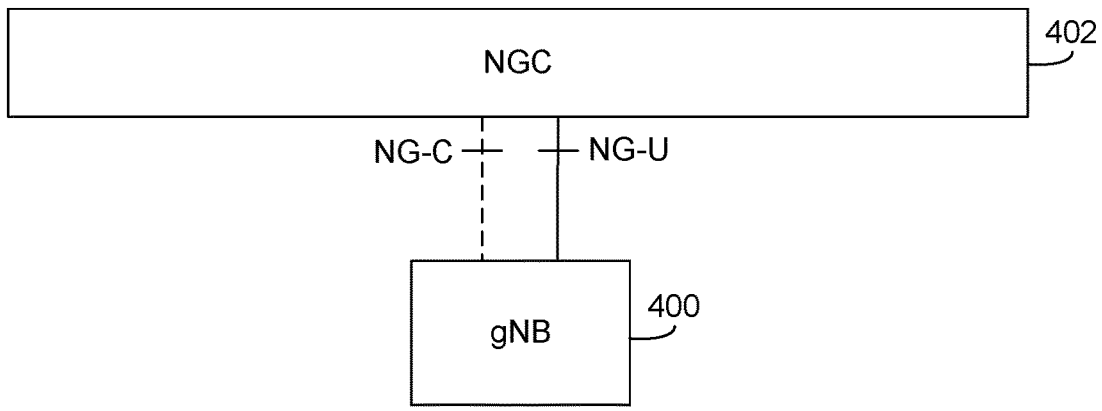
FIG. 1A shows a first arrangement for communication between a new radio NR base station and a new generation radio core NGC.

One possible configuration is shown in FIG. 1A, where the NR NodeB (gNB) 400, is connected to the core network, sometimes referred to as the new generation core network NGC 402. A control plane connection NG-C, called the NG2 interface, and user plane connection NG-U, called the NG3 interface, are provided between the base station gNB and the core NGC.

Figure 1B:
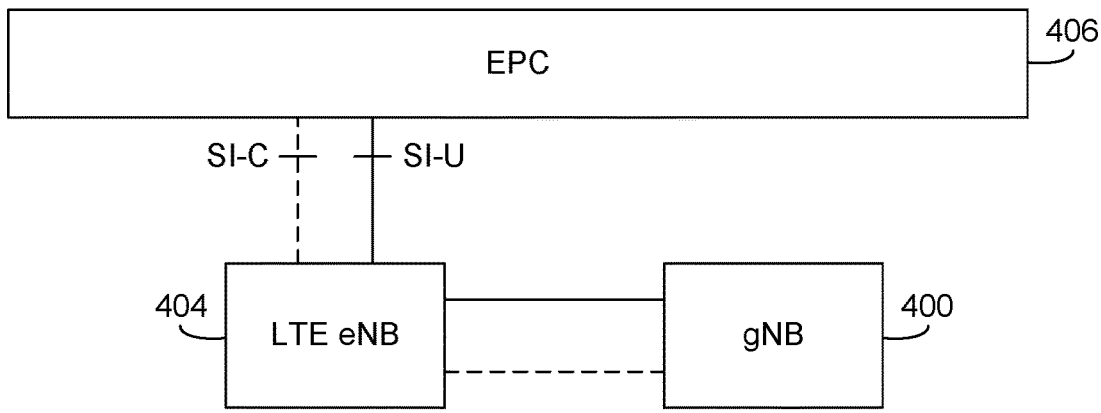
FIG. 1B shows a second arrangement for communication between a new radio NR base station and a new generation radio core NGC.
Figure 1C:
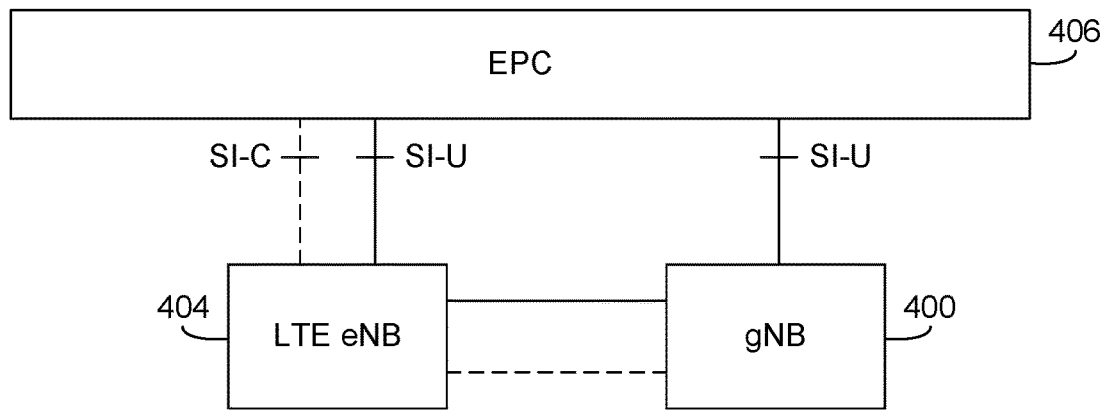
FIG. 1C shows a third arrangement for communication between a new radio NR base station and a new generation radio core NGC.

In an alternative configuration shown in FIGS. 1B and 1C, the eNB 404 is connected to the evolved packet core EPC 406 with non-standalone NR.

In the configuration of FIG. 1B, the NR user plane connection and the NR control plane connection to the EPC 406 goes via the LTE eNB 404. The user plane connection S1-U and the control plane connection S1-C is provided between the EPC and the LTE eNB. There is thus a connection between the gNB and the LTE eNB.

In the configuration of FIG. 1C, the NR user plane connection S1-U from between the gNB and the EPC is direct. The control plane connection between the gNB and the EPC is via the LTE eNB. There is a user plane connection S1-U and the control plane connection S1-C is provided between the EPC and the LTE eNB. There is thus a connection between the gNB and the LTE eNB.

Figure 1D:
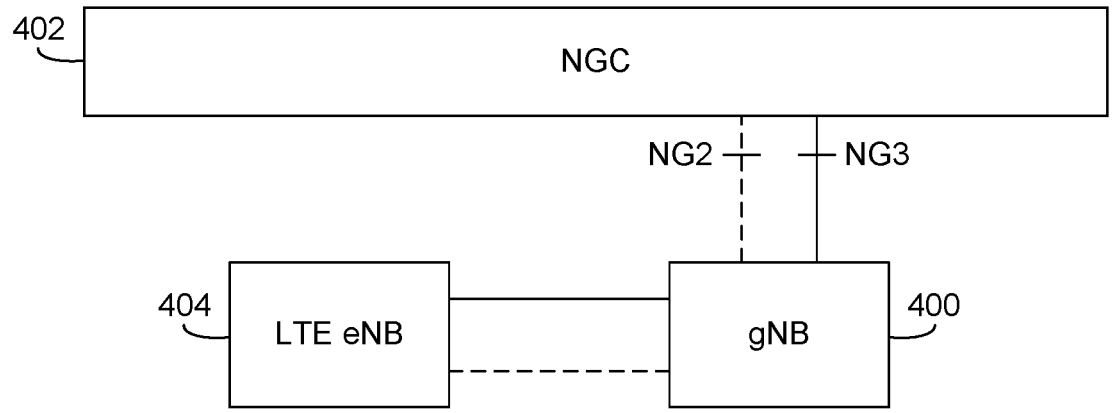
FIG. 1D shows a fourth arrangement for communication between a new radio NR base station and a new generation radio core NGC.

In the configuration of FIG. 1D, the NR user plane connection NG3 and the NR control plane connection NG2 between the gNB and the NGC are direct. The LTE eNB connects to the NGC via the gNB via both the user and control plane connections. There is thus a connection between the gNB and the LTE eNB.

Figure 1E:
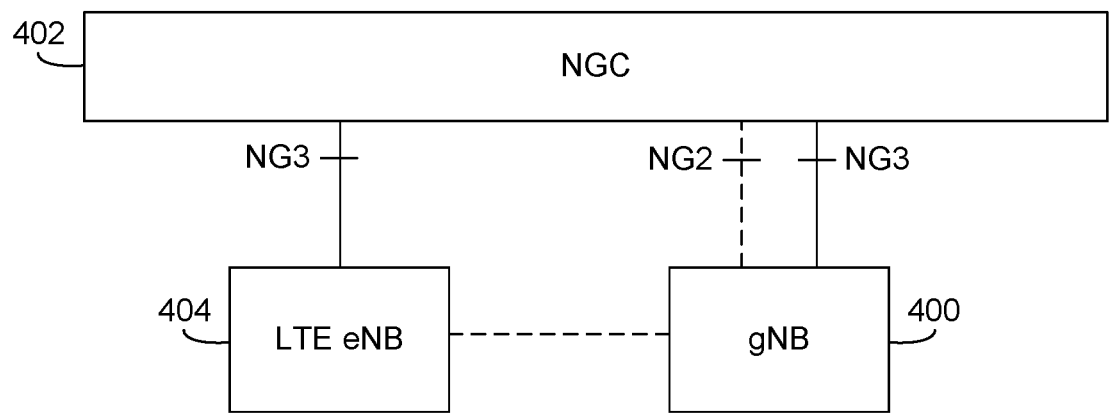
FIG. 1E shows a fifth arrangement for communication between a new radio NR base station and a new generation radio core NGC.

In the configuration of FIG. 1E, the NR user plane connection NG3 from between the NR control plane connection NG2 between the gNB and the NGC are direct. The control plane connection NG2 between the LTE eNB and the NGC is via the NR gNB, but there is a user plane connection NG3 directly from LTE eNB to the NGC. There is thus a connection between the gNB and the LTE eNB.

For any of the options shown in FIGS. 1A-E, the user equipment has to access the NR gNB. Some embodiments may provide a mechanism of access control to the NR eNB to determine which user equipment or user devices may attempt a connection.

In initial 5G cell deployments, depicted in FIGS. 1B and 1C where LTE eNB may serve the role of primary access node, the existing LTE Access Control may apply, since UE starts its connection via LTE eNB. However, the LTE Access Control that uses an Access Class Barring (ACB) mechanism may not provide a good load control in NR deployments and use cases, since this mechanism primarily controls the load for the LTE system.

Generally, randomization-based access control mechanisms in one traffic scenario may not provide reliable or adequate means for specific services in all scenarios. LTE, across releases, has introduced number of access optimization mechanisms on top of the basic ACB, with various optimization mechanisms aimed at prioritizing different services via different parameters.

The LTE ACB mechanism comprises a set of access classes. For example classes 0 to 9 are for regular users, class 10 is for emergency calls and classes 11 to 15 are for high priority or operator services. The eNodeB may broadcast an access probability and an access class barring time for users in a class. When a user device request access, it derives a random number between 0 and 1 and compares that number to an access probability. When the number is less than the access probability, the device proceeds to the random access procedure. Otherwise, the device is barred for a time duration before it can attempt to access the network again.

Enhanced control mechanisms have changed or even overwritten the original ACB mechanism—for example ACB skip, Extended Access Class Barring (EAB), Service-Specific Access Control (SSAC), and Application specific Congestion control for Data Communication (ACDC)—with the aim of being more flexible than the original ACB approach for load control. These are discussed in more detail later.

If, for the sake of compatibility, NR inherited LTE access control mechanisms such as those identified above, the following barring parameters would need to be supported by the NR Radio Resource Control (RRC) protocol layer:

ACB (in System Information Block (SIB) 2 for all user devices indicates barring probability and barring time), distinguished per access type:
   For special Access Class (AC) (i.e. operator and public safety services)—AC11-15
   Emergency calls (specific only to such calls)—AC10
   Mobile Originated (MO) signalling (e.g. signalling to establish connection to International Mobile Subscriber (IMS))—any AC
   MO data (normal user equipment-initiated data transfer)—Any AC EAB (in SIB14, for EAB-capable user devices and in SIB14-NB for NB-Internet of Things (IoT) user devices)
   This access barring is intended for delay-tolerant services, e.g. Machine Type Communication (MTC) services without strict delay requirements ACB for Circuit Switched Fall Back (CSFB) (in SIB2, separate access control for user device using CS services)
   Indicates whether ACB is utilized for the CSFB services SSAC (in SIB2, allowing different access control for IMS voice and video services)
   Defined for IMS (IP multimedia subsystem) Multimedia Telephony (MMTEL) voice and MMTEL video ACB skip (in SIB2) allowing certain services to skip the configured ACB (to allow prioritization of certain services over others)
   Defined for MMTEL voice, MMTEL video and Short Message Service (SMS)

ACDC (in SIB2, application (group)—specific access control)
   Defined per Public Land Mobile Network (PLMN) and for up to 16 application IDs—allows blocking only certain applications or application groups.

The parameters are contained across a number of SIBs (but mostly in SIB2 and SIB14 in LTE) and all attempt to cater to network sharing as per normal 3GPP SA1 service requirements. Since the system information model in NR may have additional limitations (e.g. beam sweeping for higher frequencies may make broadcast information less efficient) and the physical layer may be different compared to the LTE system information broadcast, the access control policies for the next generation user equipment accessing gNB may need to be revised to be efficient.

In addition, coming together with 5G, the requirement for Network Slicing brings additional requirements. Network Slicing requires differentiated treatment depending on each user's needs (e.g. requested services and active subscription) and capabilities. With slicing, users may be associated with different slice types, with each possibly offering different services and having different capabilities. The approach requires adaptive and explicit priority treatment mechanisms, based on for example users' subscriptions. However, the existing access control concept may not be appropriate for NR, and defining additional priority exceptions over mandatory and primary mechanism of LTE (i.e. ACB), may be undesirable.

Some embodiments may address one or more of the above issues.

In some embodiments, each user device may utilize a programmable Access Class, also referred to as an Access Group, when triggering access to the network. The same user device may therefore have a different Access Group at different times. The Access Group may be based on, for example, one or more of user subscription data, operator policies and an indication signalled by the network. The Access Group should preferably correspond to a user's service preferences or policies for special groups/service type treatment.

For example, there could be an Access Group for all IMS services, an Access Group for different network slices (e.g. eMBB (extended mobile broadband), URLLC (ultra reliable low latency communication), MTC, V2X (vehicle to everything), Voice, Video), an Access Group for high-priority services (e.g. those corresponding to AC11-15), and Access Group for video services (e.g. Netflix, Amazon Prime Video) and so on. The Access Group allows the achieving of the users' service preferences by accommodating users with similar services in the same manner. This may allow the network to control how such users access the network and behave in the case of e.g. temporary or long-term congestion and/or preferential treatment during e.g. certain service hours according to subscription parameters.

The number of access groups may be any suitable number. For example, there may be up to 32 groups. However, in different applications there may be more or less than 32 groups. Different groups may be associated with different probabilities of success of an access attempt. Preferences can be achieved by controlling the probability factor (e.g. factor can be set to zero value) or by setting a flag for a certain group.

The way the user device determines the Access Group each time the user device is to attempt to access the network may be based on one or more of the network resources to be accessed (e.g. used network slice), the user service type (e.g. voice or data), the user equipment's capabilities (support for certain features), and a network indication.

The Access Group, also termed programmable Access Class or variable Access Class, may be combined with mechanisms for the control of initial access in NR. This may be implemented by defining user equipment classes denoting the user equipment's predominant capability (or alternatively or additionally, subscription or service request). The gNB may utilize barring configuration parameters based on the identified service type priority. A network indication may inform a user equipment to modify its Access Group according to a pre-defined scheme (e.g. to randomize the Access Group, or set the Access Group to a specific value for a specific service).

This access group may be defined is per UE, not per cell. What the cell broadcasts may affect how each UE derives their access group. For example, a cell may broadcast that all UEs use legacy access classes. In that case, there is no programmability applied. In a different case, the cell broadcasts to de-prioritize MTC users, in which case those user devices might use an access glass that results in a lower probability of access.

In general, an access group is individual to a UE. However, in some scenarios, if resources are supposed to be reserved in a certain cell only for a certain group of UEs, then it can appear the whole cell is serving an access class or group specifically and in a common way In case there is a new mechanism for access control defined later on, herein called a future access control mechanism, it can be defined that the legacy users not understanding how to utilize such a future access control mechanism may default to instead use a specific other access barring method. For example, if the signalling indicates a value that is not understood by the UE, corresponding to a future access control mechanism, the UE may instead utilize a default access barring method. The default access barring method may be according to an implicitly determined way (e.g. UE always utilizes the legacy access control mechanism).

Broadcast, multicast or unicast messages may be available on a cell/beam basis, indicating the class(es) or groups of subscribers, which provides means at the network side to control initial access attempts per service.

For a 5G compatible user equipment, service accessibility in NR may depend on an Access Group indicator that is characteristic of one or more of:
an access indicator,
a user equipment type or category
a requested service
a corresponding network slice characteristic.

5G-RAN may then use the indicator to control a user equipment's access attempts.

In some embodiments, there may be prerequisites to determining the Access Group. The user equipment is provisioned with an allocation to a group of subscriber's type, e.g. an indicator that determines in a unique way one or more of the user equipment class, category and its interest in a service and/or slice.

The indicator may be provided to the mobile device SIM card or, if it is exposed to Open Mobile Alliance (OMA) server, to an OMA Device Management (DM) element.

A roaming user equipment may be handled either according to home operator policies or visited network information.

The allocation to a group of subscriber's type may be modified according to one or more algorithms. Thus the allocation is not required to be fixed according to e.g. the last International Mobile Subscriber Identity (IMSI) digit.

The allocation may be based on one or more IMSI digits of Universal SIM, e.g. the IMSI may serve as a random seed for a user equipment determining a random Access Group or the network may indicate to the user equipment to use certain digits in a specific way to determine the Access Group. The allocation may be determined based on requested service identified in a unique way at a 5G core network.

There may be one or more of the following types of indicators:
i) Default: this does not indicate any specific service inquiry. This may correspond to regular LTE Access Classes (with range 0-9) in existing technologies to allow backward compatibility to legacy systems. The signalling may indicate that the legacy ACB mechanism is to be used.
ii) Prioritized: this may indicate the absolute priority need for a subscriber's type, e.g. emergency needs. The range of indicators may correspond to one or more of the LTE definition of five special categories (i.e. LTE Access Classes 11 to 15).
iii) Specific: this may take a specific meaning. This may be further modified according to signaled parameters. The indicators determine one or more specific service types and/or user equipment capabilities (e.g. eMBB (extended mobile broadband), MTC, IoT, Autonomous driving, URLLC (ultra reliable low latency communication), MCV (mission critical video), MCPTT (mission critical push to talk). This may correspond to a new dimension of extended range of Access Groups.

The 5G-RAN may be provided with data related to operator's barring policies. The provided data may allow mapping between an operator's barring policies and the provided users' allocations groups.

The gNB may broadcast access control information according to the operator's barring policies.

In one embodiment, a user equipment with a user equipment specific Access Group is configured with an Access Control configuration via a Network Access Server (NAS) or broadcast signalling, facilitating association with a Network Slice.

The user equipment may store a value of the Access Group indicator and perform a check of Access Control configuration for Access Groups (for example, barring), along with selection of other access resources (e.g. carrier frequency, random access preamble group or other random access parameters) to perform an initial access attempt. Such selection is based on parameters received to apply for access control towards the gNB and the chosen access group indicates which corresponding parameters are used towards the random access. For example, a UE utilizing URLLC may utilize a random access configuration dedicated to that service or network slice, along with access control parameters that are only applicable to URLLC. Some embodiments may not impact the RACH procedure.

Figure 2A:
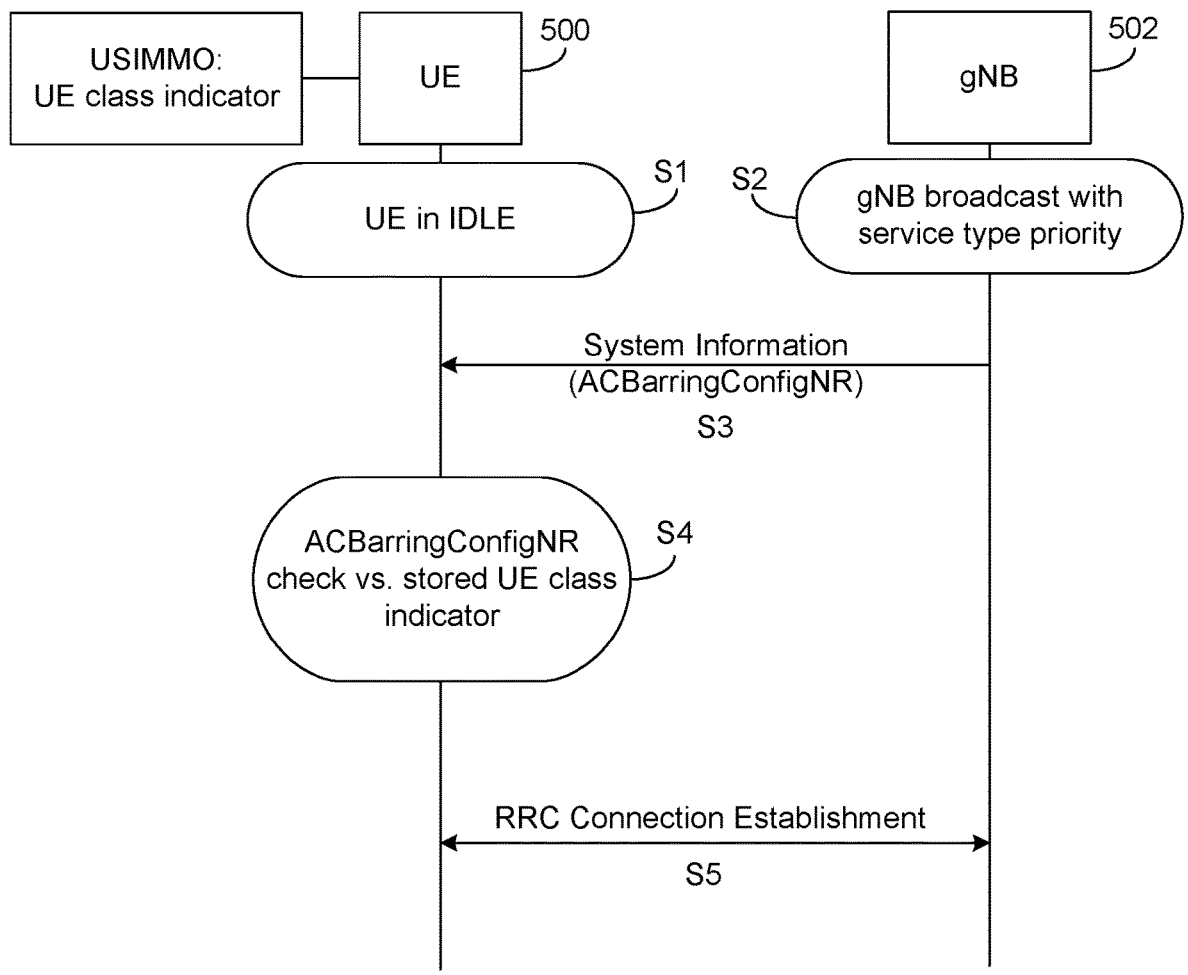
FIG. 2A shows a signal flow of an example method according to some embodiments.

FIG. 2A shows an example signal flow in some embodiments.

Initially in S1, the user equipment UE 500 is initially idle (i.e. with no established user plane connection), and is attempting to connect to a NR base station gNB 502.

The base station gNB 502 indicates (via e.g. broadcasting, multicasting or with dedicated signalling) the service type priority, access control parameters for the service type and information on supported network slices and their identities in step S2. This may also include Access Group information and how to map each service to a specific Access Group. This will facilitate association with a network slice, service and/or the like. This information will be received and stored in the UE. The access control indicators provided may either be a flag or access barring related configuration or factors.

In step S3, the gNB 502 transmits system information to the UE. In this example, this information is access control barring configuration for NR.

In step S4, the UE will check the received access control barring configuration against the stored UE Access Class indicator. Part of the stored information may be received from the gNB when first attaching to the network and part may be received from gNB in step S2. If the UE stored indicator matches any of the access group barring configuration for specific access groups, the UE considers the cell as not barred. The stored information can be received from one or more of a user subscription data (USIM card), a server or a repository capable of allocating a UE class indicator.

In response to the check, a RRC connection establishment procedure is followed in step S4. This is assuming that the cell is not barred.

Figure 2B:
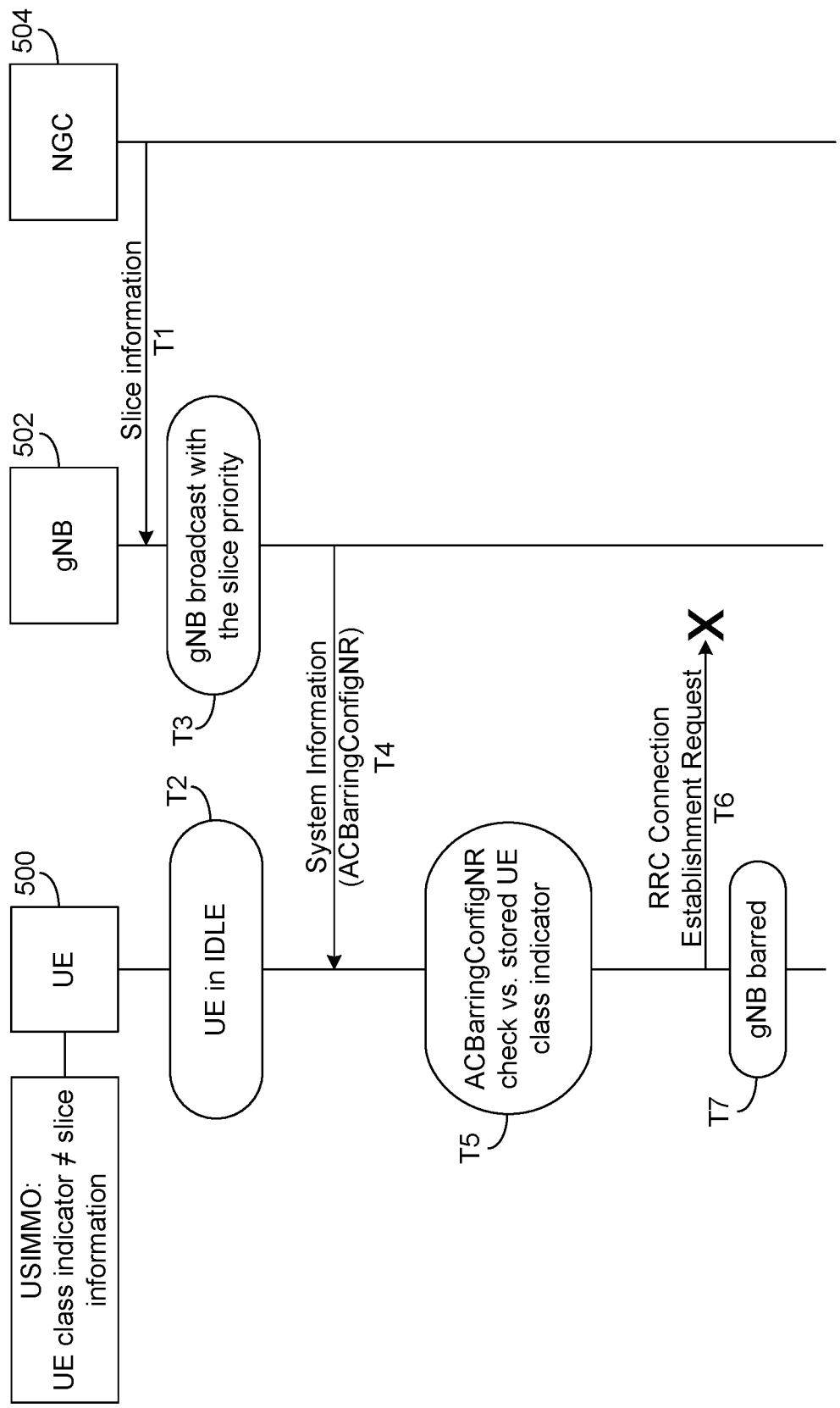
FIG. 2B shows a signal flow of an example method according to some embodiments.

Reference is made to FIG. 2B which shows another signal flow.

In step T1, the NGC or core 504 transmits slice information.

In step T2, the user equipment UE 500 is initially idle (i.e. with no established user plane connection), and is attempting to connect to a NR base station gNB 502.

The base station gNB 502 broadcasts the slice priority in step T2. This information will be received and stored in the UE.

In step T4, the gNB 502 transmits system information to the UE. In this example, this information is access control barring configuration for NR.

In step T5, the UE will check the received access control barring configuration against the stored UE class indicator. If the UE determines that the access control configuration information for a specific access class does not correspond to the UEs access group, the UE considers the cell to which the UE is attempting to connect to be barred for a period of time, during which the UE is not allowed to repeat the same access request. The UE can either try again to access the cell after a timer expires, or may be redirected to another cell if instructed to do cell reselection.

In response to the check, a RRC connection establishment procedure is stopped or not even started in step T5. This is assuming that the cell is barred.

Thus in step T6, the gNB is considered barred.

The UE may perform an access barring check based on barring parameters, for example a factor and a timer such that the UE determines a probability to bar access for the duration of the timer.

In another embodiment, the UE may determine an Access Group to be used for establishing a connection based on pre-existing information within the UE, for example the IMSI in a USIM, and compares the pre-determined Access Group to the Access Group received in signalling from the network in order to determine Access Control.

The UE may randomize the Access Group to be used for connection establishment using the pre-determined information according to an indication in the system information.

The UEs in a Home Public Mobile Land Network (HPLMN) may use a specific digit of the IMSI to determine the Access Group according to an indication in the system information.

In another embodiment, a UE with a 'default' UE class allocation may be configured such that an Access Control configuration is determined via broadcast signalling, and may then subsequently perform an Access Barring check based on barring parameters such as a probability factor and a timer as described previously.

The gNB may identify a need for limiting or prioritizing services in dependence on the slicing information received from the NGC 204.

The gNB broadcast barring configuration may be tailored differently depending one or more of load, congestion and slicing priorities.

In some embodiments, the gNB may provide an indicator for the UE classes that correspond to a network slice. The indicator tells that the service is mapped to a particular network slice by the UE, so that when the UE performs the access control for those services it considers the access control according to parameters corresponding to that network slice. This allows network to configure which services are mapped to which network slices.

For one or more access classes, the network can signal a particular barring configuration (e.g. with a timer for barring). For a given access class the gNB may uses a flag "0/1" decision so that the UE can always or never access the cell at a given point of time. If the flag corresponds to a given group of UEs, those UEs can or cannot proceed with an access, depending on the flag value.

The UE 200 may determine if a connection to a cell 502 is barred or not in dependence on a comparison between a UE Access Class (determined according to the used Access Group) and an Access Control Barring configuration received from the network. As the Access Group of the UE may change each time access is needed, or the Access Control Barring configuration signalled by the network may change (for example, in dependence on information received by the cell 502 from the NGC network 204), the barring process may be dynamic. The UE thus may derive its access group, and from that it will know the parameters to use. With an access class is there as legacy mechanism. The access Group may be derived from AC and other parameters (service, slice, etc.). The access control barring configuration may be received from gNB. The UE determines its Access Group and then matches that with the barring information from the network. The approach described herein ensures forward compatibility with future 5G standards, while retaining backwards compatibility with legacy systems for signalling of information from the gNB.

The extension of Access Group and the Access Control mechanism may ensure forward compatibility. In some embodiments for backward compatibility, the legacy system may be the baseline for signalling of the information from gNB.

An example of ASN.1 coding for the new Information Element can be as follows:

```
AccessBarringConfigNR ::=    SEQUENCE {
     ac-BarringType          ENUMERATED{off, legacyACB,
                             dynamicAGB, futureMechanism}
}
``` dynamicAGB defines the access group barring configuration including access class-barring for a specific access class.

This may allow some UEs to only use the "legacyACB", and also allows the NW to only use that if the ac-barring type is not supported.

This may allow an indication that a dynamic access class barring is used for UEs that support that, without impacting the system information SI with details. This may imply a regular access barring check. From the NW side the use of AC in barring parameters would not be random. For example, a slicing configuration is triggered.

Some embodiments may optionally allow some extendibility with the "future mechanism" option. This reserves a code point should there be a future need.

By using this field backward compatibility may be achieved.

Figure 5:
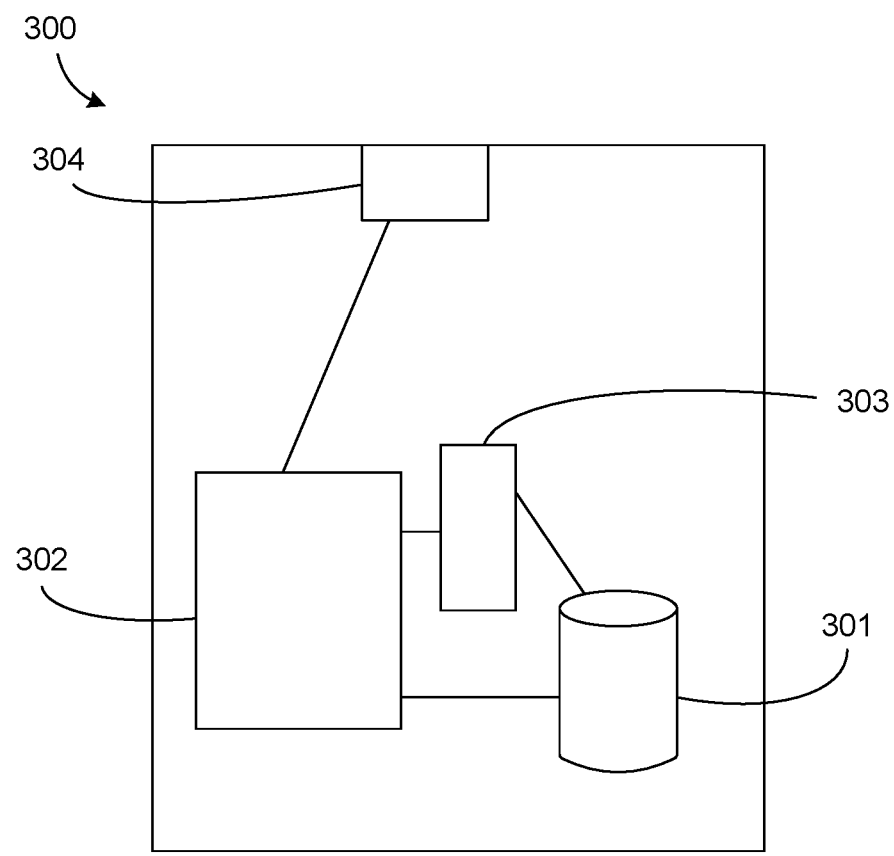
FIG. 5 shows a schematic diagram of an example control apparatus

The method may be implemented in entities on a mobile device as described with respect to FIG. 4 and/or control apparatus as shown in FIG. 5. FIG. 5 shows an example of a control apparatus for a communication system, for example to be coupled to and/or for controlling a station of an access system, such as a RAN node, e.g. a base station, (e)node B or 5G AP, or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. In some embodiments, the control apparatus is part of the base station or gNB.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G networks, similar principles can be applied in relation to other networks and communication systems, for example, other implementations new radio networks, or MIMO systems in LTE networks or systems or standards being implemented in any other country. Some embodiments may be applied to current networks or standards.

Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving, by a user device from a base station, information indicating that dynamic access barring will be used to control network access for the user device;
receiving, by the user device from the base station, an access group indicator that is assigned to the user device;
determining, by the user device based on the information indicating that dynamic access barring will be used, to use the received access group indicator that is assigned to the user device for network access;
receiving, by the user device from the base station, an access class barring configuration for one or more access group indicators;
comparing, by the user device, the access group indicator assigned to the user device to an access group indicator associated with the one or more received access class barring configurations;
determining, by the user device based on the comparing, a first access class barring configuration for the access group indicator assigned to the user device; and
using, by the user device, the first access class barring configuration when determining whether to attempt access to the base station;
wherein if the user device does not receive an access class barring configuration for the access group indicator that is assigned to the user device, this indicates that the user device is barred from network access.

2. The method of claim 1, wherein the first access class barring configuration includes a flag that is set to either a first value indicating that the user device is barred from network access, or set to a second value indicating that the user device is not barred from network access.

3. The method of claim 1, further comprising:
determining, by the user device, a default access group indicator for the user device; and
using, by the user device, the access group indicator that is assigned to the user device instead of the default access group indicator to determine network access, based on the information indicating that dynamic access barring will be used and the access group indicator that is assigned to the user device.

4. The method of claim 1, further comprising:
receiving, by the user device from the base station, information instructing the user device to modify the access group indicator that is assigned to the user device; and
modifying, by the user device, the access group indicator that is assigned to the user device to a modified access group indicator; and
using, by the user device, an access class barring configuration associated with the modified access group indicator when determining whether to attempt access to the base station.

5. An apparatus, comprising:
at least one processor; and
at least one memory including computer program code;
the at least one memory and the computer program code configured to, with the at least one processor, cause the apparatus at least to:
receive, by a user device from a base station, information indicating that dynamic access barring will be used to control network access for the user device;
receive, by the user device from the base station, an access group indicator that is assigned to the user device;
determine, by the user device based on the information indicating that dynamic access barring will be used, to use the received access group indicator that is assigned to the user device for network access;
receive, by the user device from the base station, an access class barring configuration for one or more access group indicators;
compare, by the user device, the access group indicator assigned to the user device to an access group indicator associated with the one or more received access class barring configurations;
determine, by the user device based on the comparing, a first access class barring configuration for the access group indicator assigned to the user device; and
use, by the user device, the first access class barring configuration when determining whether to attempt access to the base station;
wherein if the user device does not receive an access class barring configuration for the access group indicator that is assigned to the user device, this indicates that the user device is barred from network access.

6. The apparatus of claim 5, wherein the first access class barring configuration includes a flag that is set to either a first value indicating that the user device is barred from network access, or set to a second value indicating that the user device is not barred from network access.

7. The apparatus of claim 5, wherein the computer program code and the at least one processor are configured to further cause the apparatus to:
determine, by the user device, a default access group indicator for the user device; and
use, by the user device, the access group indicator that is assigned to the user device instead of the default access group indicator to determine network access, based on the information indicating that dynamic access barring will be used and the access group indicator that is assigned to the user device.

8. The apparatus of claim 5, wherein the computer program code and the at least one processor are configured to further cause the apparatus to:
receive, by the user device from the base station, information instructing the user device to modify an access group indicator that is assigned to the user device; and
modify, by the user device, the access group indicator that is assigned to the user device to a modified access group indicator; and
use, by the user device, an access class barring configuration associated with the modified access group indicator when determining whether to attempt access to the base station.

* * * * *